Figure 1:
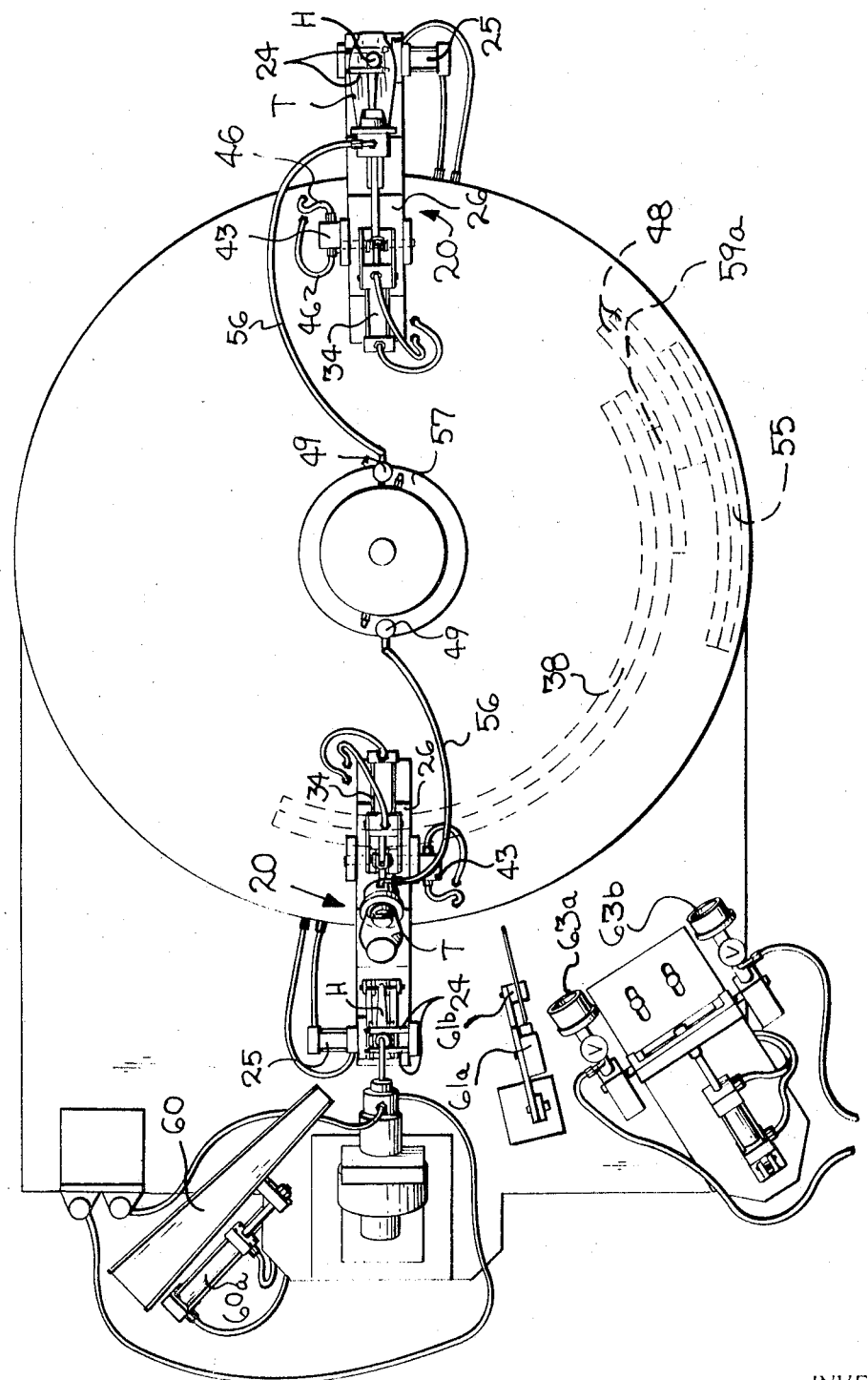

United States Patent

[11] 3,622,424

| [72] | Inventor | John R. Mechel |
| | | Maumee, Ohio |
| [21] | Appl. No. | 854,156 |
| [22] | Filed | Aug. 29, 1969 |
| [45] | Patented | Nov. 23, 1971 |
| [73] | Assignee | Owens-Illinois, Inc. |

[54] MACHINE FOR UNITING GLASS PARTS
10 Claims, 4 Drawing Figs.

[52] U.S. Cl............................................... 156/499,
156/295, 156/363
[51] Int. Cl.....................................................B32b 31/20,
C09j 5/06
[50] Field of Search............................................ 156/499,
295, 363; 118/231, 301

[56] References Cited
UNITED STATES PATENTS

| 781,333 | 1/1905 | Edson............................ | 118/231 |
| 3,359,941 | 12/1967 | Sible............................. | 118/301 |
| 3,367,824 | 2/1968 | Mallory et al.................. | 156/363 |
| 3,439,590 | 4/1969 | Rosenberg et al............. | 156/499 X |

*Primary Examiner*—Benjamin A. Borchelt
*Assistant Examiner*—G. E. Montone
*Attorneys*—Richard B. Dence and E. J. Holler ABSTRACT: This is a substantially completely automatic rotary machine comprising a horizontal rotatable index table carrying an annular series of identical heads, each including a chuck or holder for a glass tumbler and a chuck or holder for a handle, medallion or the like which is to be epoxy-resin welded to the tumbler. The tumblers are held on the chucks by vacuum, while the handles or medallions are positively supported nearby and, incident to indexing of the table, are brought in succession to a station at which a measured amount (a drop or two) of epoxy-resin is deposited upon a selected area, or so-called "button" of such handles, preparatory to bringing the tumblers in a preheated condition into firm contact with the resin-coated area of preheated handles, or medallions. Following such initial interengagement of these parts they are so held firmly together during succeeding indexing of the table so as to effect at least initial "curing." Detecting elements are so positioned in advance of the epoxy-resin dispenser that they must be actuated by both a tumbler and a handle in the same head in order to effect delivery of resin to a selected part of the handle. Thus, resin delivery is effected only if a handle is about to arrive at the dispensing station accompanied by a companion tumbler to which is desired to weld the handle.

MACHINE FOR UNITING GLASS PARTS

DESCRIPTION OF THE PRIOR ART

In U.S. Pat. Nos. 3,262,828 and 3,367,824, both issued jointly to J. D. Mallory and L. D. Ryan, as well as U.S. Pat. No. 3,186,080, issued to said J. D. Mallory, all owned by the assignee of the instant application, there is disclosed mechanism for epoxy-resin welding glass parts together and utilizing cooperating handle and tumbler holders. As contrasted with the present invention, however, these earlier patents involve a floor-space consuming, straight line operation in which essentially all operative steps are effected manually. Moreover, the epoxy-resin is initially deposited upon the tumbler itself rather than upon a designated small surface area of the handle, known as a "button." Thus, in the patented mechanism, the deposited resin tends to flow haphazardly over the tumbler surface and consequently detracts from its final appearance and commercial acceptability.

COnsequently, among other important objectives of the present invention is the provision of a rotary machine which materially conserves floor space and in which all operations with the exceptions of loading and unloading are completely automatic.

Another important objective of the present invention is the provision of a machine having the last-mentioned characteristics and which also embodies novel tumbler and handle chucking devices arranged in an annular series upon a horizontal index table.

It is also a further objective of the present invention to provide a novel epoxy-resin feeder embodying control means which must be actuated by the presence of both a tumbler and a companion handle or medallion in a specific zone or station in order to permit delivery of a measured amount of such resin to a preselected area normally and ideally occupied by the handle or medallion.

It is likewise a further objective of the present invention to provide a novel chuck or holder which firmly, yet yieldingly, supports the handle with a button or attaching pad facing upwardly, initially to receive a drop or two of the resin, and subsequently, to secure the handle in position to be engaged by a chuck-carried tumbler.

Other objects and advantages of the present invention will be in part apparent and in part pointed out hereinafter.

Figure 2:
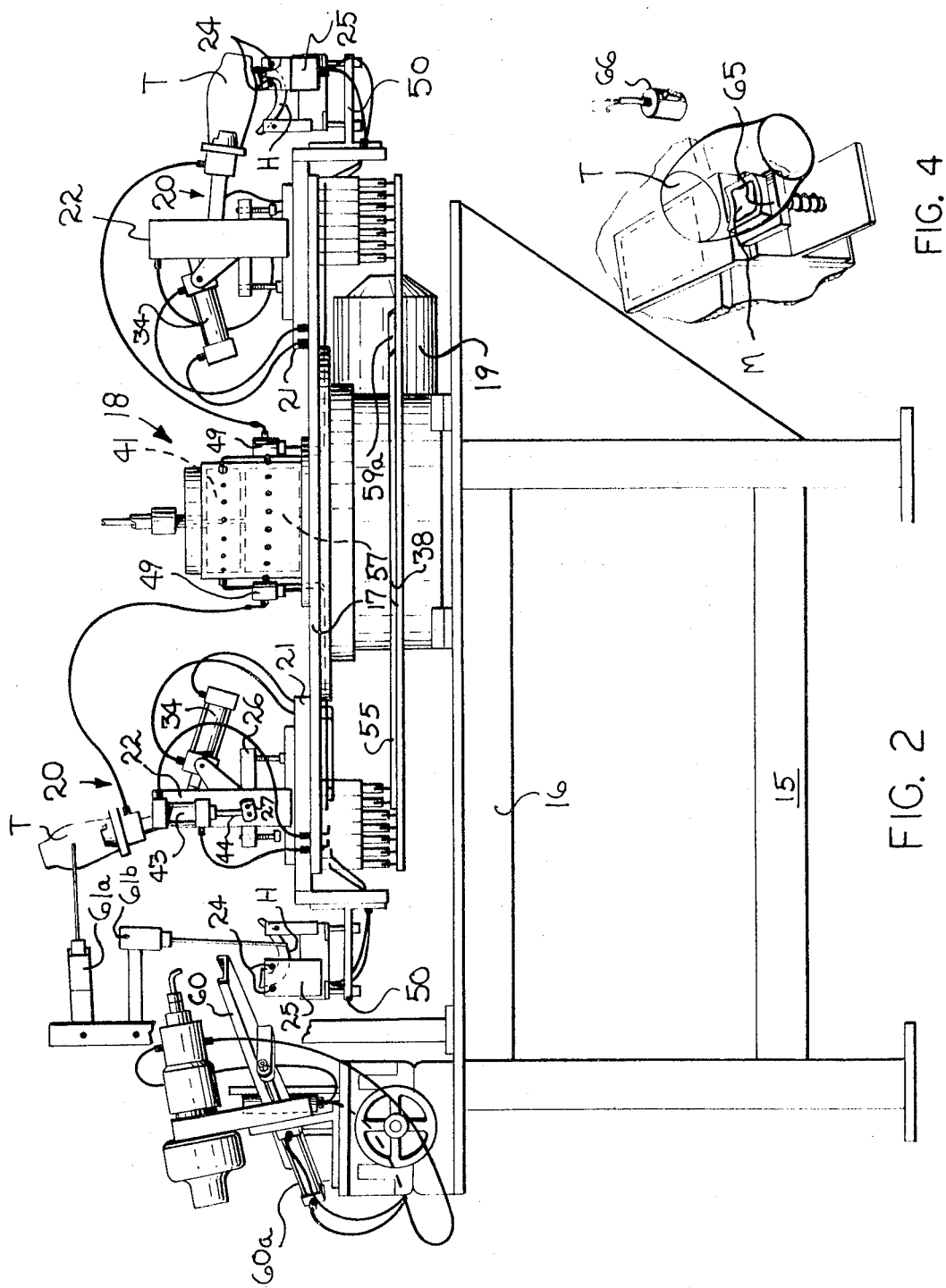
Figure 3:
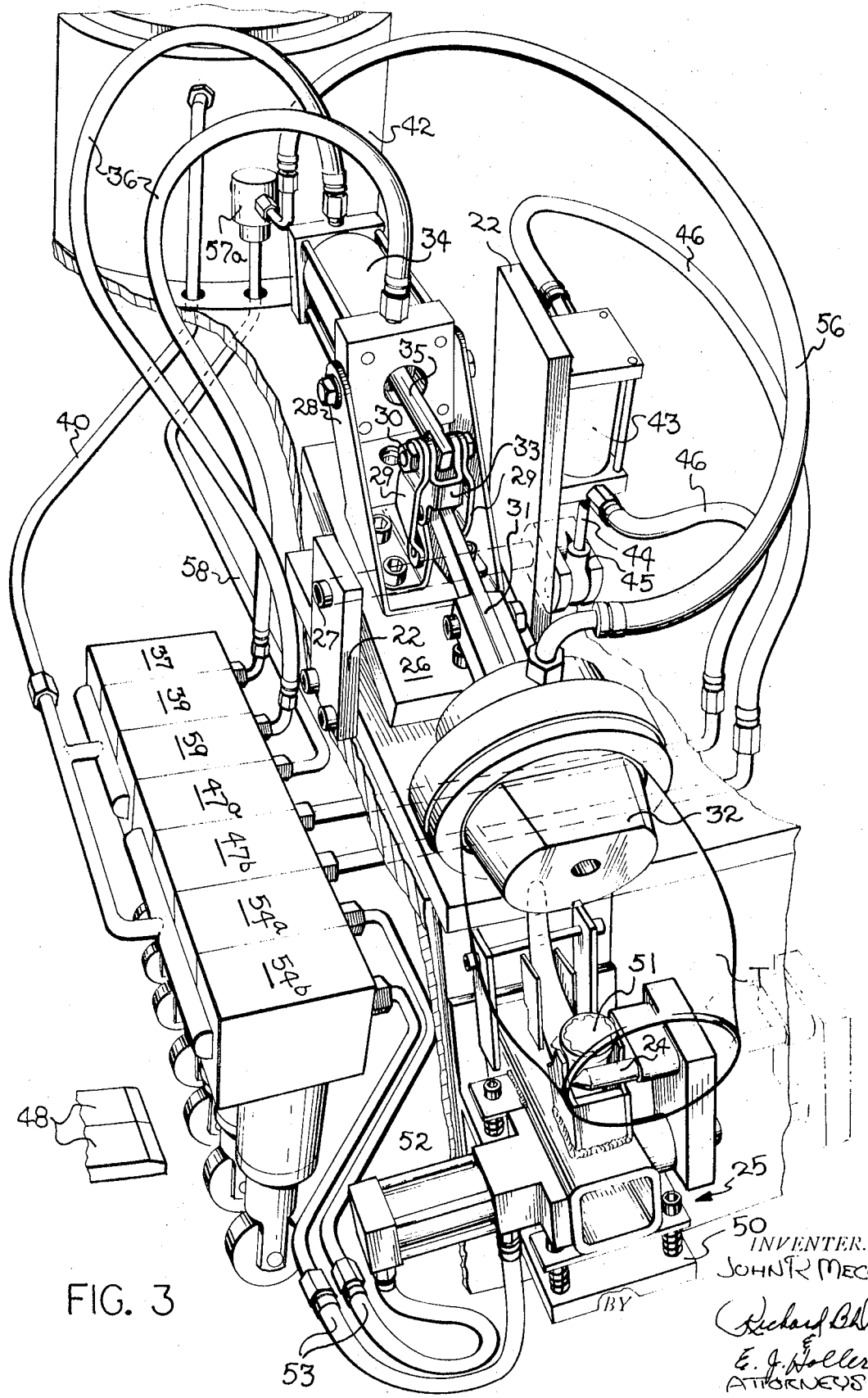

In the accompanying drawings, forming a part of my application:

FIG. 1 represents a top plan view of the machine, in large part schematically illustrating the essential components and the cycle of operations involved, and showing only a few of the heads; and, FIG. 2 depicts a schematic side elevational view of the machine showing only two diametrically opposed heads or chuck assemblies, one such head being located just beyond the loading zone and the other being located in a position approaching the unloading station where the welded elements are removed; and, FIG. 3 shows a detailed perspective view of one head or chuck assembly with a tumbler secured to the vacuum chuck, and the handle chuck supporting a handle, there also being shown associated air pressure and vacuum conduits, along with flow control means; and, FIG. 4 represents a perspective view showing in lieu of the handle chuck, a yieldingly supported medallion holder.

In the preferred embodiment of my invention depicted in FIGS. 1–3, the machine is designed specifically to weld glass tumblers and glass handles together, whereas in another embodiment shown in FIG. 4, the handle chuck has been replaced by a medallion holder, as will be explained hereinafter.

As best illustrated in FIG. 2, the machine generally comprises a supporting frame 15 for a horizontal platform 16, upon which an index table 17 is mounted for step-by-step advancement about a central vertical column 18, or hub. Any conventional power plant 19 may be utilized to so move the table 11, each step advance preferably being the distance circumferentially between the heads 20, or chuck assemblies, which in essence are holders for tumblers T and handles H or alternative medallions M (FIG. 4).

Each such head, or assembly, comprises a base 21 which is secured to the table and which has a pair of parallel spaced-apart, upstanding arms 22 rising from the base; between which a tumbler chuck unit 23 positioned for both limited, substantially vertical, straight line bodily movement and, as a distinctly different succeeding step, oscillation about a horizontal axis between tumbler loading and unloading positions (FIGS. 2 and 3) in a loading and unloading zone. Such vertical bodily movement is solely for the purpose of breaking contact between the handle H and locking pins 24 of a handle chuck 25 so that such pins may be retracted (FIG. 3) without any surface drag on the glass handle H and thereby permit removal of such handle along with the tumbler to which it has been welded.

As best observed in FIG. 3, a rockable carrier-plate 26 is mounted upon a hinge pin 27 secured at its ends in the two upstanding arms 22. A bracket 28 on this carrier-plate 26 supports a pair of swingable parallel vertical fingers 29 interconnected at their upper ends by a horizontal pivot pin 30. A carrier rod 31 for the vacuum tumbler chuck 32 is interconnected by the pivot pin 30 to a short lever 33. An air-actuated piston motor 34 operates a piston rod 35 interconnected with the carrier rod 31 in such manner as to move the tumbler chuck between the two extreme alternative positions depicted in FIG. 2. Air pressure supply lines 36 are connected to opposite ends of the piston motor 34. One such line 36 interconnects the foremost end of the motor to a normally open airflow control valve 37 which is closed periodically by a cam section 38, whereas the other air pressure supply line 36 is connected to a normally closed control valve 39 positioned beside the normally open valve 37 in banklike formation. Air under pressure is supplied to these valves 37 and 39 by way of a conduit 40 extending to the latter from the upper chamber 41 of the manifold 42, or distributor located at the axis of the machine.

The aforementioned, substantially vertical lifting of the entire assembly relative to the handle chuck 25 is effected by a vertical piston motor 43 which is attached to one of the arms 22. This motor has its piston rod 44 connected by a finger 45 to an end of the aforementioned hinge pin 27. Thus, with axial movement of the piston rod, the hinge pin 27 is rotated and consequently causes generally vertical bodily movement of the entire tumbler chuck assembly relative to the handle chuck 25 or holder, for a distance of about one-eighth inch for the purpose explained above. Air under pressure is supplied to this vertical piston motor 43 through pipes 46, one of which leads to a normally closed control valve 47a and the other of which leads to a normally closed control valve 47a and the other of which leads to a normally open control valve 47b arranged one beside the other and actuated by fixed cams 48. Air under pressure may be conveyed to these valves from the upper chamber 41 of the manifold by an extension of the pipe 40. Thus, top pressure of the handle H upon the locking pins 24 of the handle chuck 25 is relieved.

As illustrated in FIGS. 2 and 3, the handle chuck 25 is disposed radially outward from the tumbler chuck 23 and is supported upon a horizontal bracket 50 carried by the index table 17. The chuck 25 is shaped to nestingly receive the glass handle and so support it that a button 51, or attaching pad, faces upwardly to receive a drop or two of epoxy-resin or equivalent welding agent from a feeder yet to be described. Immediately upon initial placement of a handle in the chuck 25, the locking pins 24 are projected by a piston motor 52 to straddle the handle just beneath the button 51, so as to firmly secure the handle in the chuck. Air under pressure to opposite ends of this motor 52 is delivered through pipes 53 leading from control valves 54a and 54b, one of which is normally open while the other is normally closed. Fixed cams 55 operate the valves in synchronism with other steps of an operating cycle. Air under pressure is supplied to these valves 54a and 54b by way of the aforementioned conduit 40.

The previously mentioned tumbler chuck 32 is vacuumized at regular time intervals due to its connection by a pipe 56 to the vacuum chamber 57 of the manifold 42. A vacuum release valve 57a of conventional type is provided in this pipe and at the proper time in each operating cycle is opened to the atmosphere while breaking communication between the vacuum chamber 57 and the atmosphere. The operation of the vacuum release valve 57a is accomplished by means of air under pressure supplied to such release valve through a pipe 58 leading from the latter to an air control valve 59 associated with and in a bank grouped with the other valves 37 and 47 beneath the heads 20 and actuated by the fixed cam 59a which is among the fixed cams referred to heretofore.

A measured amount of epoxy-resin is deposited upon each handle button 51 at a given station. The apparatus involved in such deposition in large measure has heretofore achieved commercial acceptance and is fully described in U.S. Pat. No. 3,262,828 of Mallory et al. Unlike the last-mentioned Mallory et al. patent, however, the present invention provides a novel device capable of receiving and collecting dispensed resin, in the event a chuck assembly arrives at the resin-dispensing station without both a tumbler and handle in proper place. SUch device comprises a collecting tray 60 mounted upon a generally horizontal piston motor 60a. A solenoid valve, not shown, controls the delivery of air under pressure to this motor and a pair of detecting switches 61a and 61b, one such as switch 61a being actuated by contact with a properly chucked tumbler T and the other 61b being actuated by a chucked handle H, operate to close an electric circuit and thereby activate the solenoid valve, not shown, which in turn retracts the collecting tray 60 from its normal position stationed beneath the resin delivery nozzle 62, permitting delivery of a drop or two of the resin upon the handle button 51. A time delay relay (not shown) predetermines the period of tray retraction time. Also, in the event either the tumbler chuck 23 or handle chuck 25 should be empty, then one of the two respective detecting switches 61a and 61b will remain open and cause the tray 60 to remain projected in position to collect the dispensed resin, since both switches 61a and 61b must be activated in order to operate the solenoid valve and retract the collecting tray.

Thus, it is evident that at the loading station a tumbler T is slipped over the tumbler chuck unit 23 and a handle H is positioned in the handle chuck (FIG. 2). Thereupon the tumbler chuck unit 23 is vacuumized and the locking pins 24 of the handle chuck are projected into holding engagements with the handle H at a location just beneath the button 51 or pad. Thereafter, advancement of these chucks 23 and 25 positions the tumbler T and handle H in locations adjacent to heaters 63a and 63b which prepare the surfaces for epoxy resin welding. Thereupon, the tumbler chuck 23 is lowered, as illustrated in FIGS. 2 and 3, to interengage the handle and tumbler and to maintain such interengagement under adequate pressure during curing and until arrival of the chucks at the unloading station whereat each successive tumbler chuck is returned to a relatively elevated position and vacuum to the tumbler chuck is shutoff to permit ready removal of the welded tumbler and handle assembly followed by reloading of the just emptied chucks.

In the event it is desired to apply a medallion, medallions M are substituted for handles H and one or more of the handle chucks 25 may be replaced, as shown in FIG. 4, by a cushioned pad 65 which supports a medallion M in position to receive a measured amount of epoxy resin. If a medallion is in place upon the pad an electric, circuit-controlling, proximity switch 66 is actuated to retract the collecting tray 60, as in the handle-welding operation.

Modifications may be resorted to within the spirit and scope of the appended claims.

1. In a machine for resin-welding elements to the exterior surfaces of hollow glass articles, a series of heads mounted in an annular array for rotation about a common vertical axis, means for indexing said heads about said vertical axis bringing them in succession to an annular array of spaced apart stations, each of said heads comprising a glassware chuck to support a hollow glass article, said glassware chuck being movable along a vertical arcuate path extending radially of said vertical axis, in companionship with said glassware chuck, a second chuck to support an element to be resin-welded to a hollow glass article, said second chuck being disposed radially outward of and in a plane below said glassware chuck, securing means for releasably securing said hollow glass article in aligned supported position on said glassware chuck, means for heating a hollow glass article and an element at one station, resin dispensing means at a succeeding station for delivering, by gravity flow, a measured amount of adhesive resin to an upwardly facing preselected surface area of said element, means for thereafter moving said glassware chuck radially outward and downward to interengage a hollow glass article supported thereon with the adhesive resin bearing surface area of said element, means at a succeeding station to automatically release said securing means relative to said hollow glass article, and means for positioning said glassware chuck and said second chuck relative to one another to facilitate removal of said hollow glass article with said element resin welded thereto.

2. In a machine as defined in claim 1, there being a retractable collecting tray associated with said resin-dispensing means and normally projecting across the delivery path of the resin, and means actuated in response to approach of loaded companion chucks to the resin delivery station for retracting said tray from said normally projecting position.

3. In a machine as defined in claim 1, there being a resin collecting tray normally positioned to preclude delivery of said adhesive resin to said element, and means including a solenoid valve and detecting switches operable by articles in companion chucks for actuating said valve and causing tray retraction.

4. In a machine as defined in claim 1, there being heating means at one or more stations in advance of said resin-dispensing means to elevate the temperature of both the hollow glass articles and the elements.

5. In a machine as defined in claim 1, there being means for bodily elevating each said hollow glass article and associated element in advance of an unloading station thereby to effect initial separation of the element from a part of its supporting chuck.

6. In a machine as defined in claim 1, wherein said securing means secures said hollow glass article to said glassware chuck be means of vacuum, and said automatic-releasing means includes means for automatically releasing said vacuum upon said hollow glass article.

7. In a machine as defined in claim 1, wherein said glassware support is adapted to support a hollow glass tumbler.

8. In a machine as defined in claim 1, wherein said second chuck is adapted to support a handle to be resin-welded to said hollow glass article.

9. In a machine as defined in claim 1, wherein said second chuck is adapted to support a medallion to be resin-wheeled to said hollow glass article.

10. In a machine as defined in claim 1, wherein said second chuck is interchangeably adapted to alternatively support a handle and medallion to be resin-welded to said hollow glass article.

* * * * *

UNITED STATES PATENT OFFICE
CERTIFICATE OF CORRECTION

PATENT NO. : 3,622,424

DATED : November 23, 1971

INVENTOR(S) : John R. Mechel

It is certified that error appears in the above-identified patent and that said Letters Patent are hereby corrected as shown below:

Col. 1, line 20, "COnsequently" should be --Consequently--;

Col. 2, lines 51 and 52, After "47a" delete "and the other of which leads to a normally closed control valve 47a"

Signed and Sealed this

Fifth Day of April 1977

[SEAL]

Attest:

RUTH C. MASON
Attesting Officer

C. MARSHALL DANN
Commissioner of Patents and Trademarks